US008291452B1

United States Patent
Yong et al.

(10) Patent No.: US 8,291,452 B1
(45) Date of Patent: Oct. 16, 2012

(54) INTERFACE FOR WATCHING A STREAM OF VIDEOS

(75) Inventors: Kuan Loong Yong, San Francisco, CA (US); Ramesh Sarukkai, Los Gatos, CA (US); Simon Ratner, San Francisco, CA (US); Julian Frumar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/287,336

(22) Filed: Nov. 2, 2011

Related U.S. Application Data

(60) Provisional application No. 61/488,682, filed on May 20, 2011.

(51) Int. Cl.
*H04N 5/445* (2011.01)

(52) U.S. Cl. ............... 725/41; 725/44; 725/52; 725/56; 715/719

(58) Field of Classification Search .............. 725/38, 725/41, 48, 49, 59, 61, 52, 56, 44
See application file for complete search history.

(56) References Cited

U.S. PATENT DOCUMENTS

| | | | |
|---|---|---|---|
| 5,926,230 A * | 7/1999 | Niijima et al. | 725/56 |
| 2006/0294545 A1 * | 12/2006 | Morris et al. | 725/41 |
| 2010/0333142 A1 * | 12/2010 | Busse et al. | 725/47 |
| 2011/0289317 A1 * | 11/2011 | Darapu et al. | 713/168 |

* cited by examiner

*Primary Examiner* — Kristine Kincaid
*Assistant Examiner* — Sumaiya A Chowdhury
(74) *Attorney, Agent, or Firm* — Lowenstein Sandler PC

(57) ABSTRACT

A method and system for browsing videos that are organized as channels. A browsing interface allows a user to browse videos with primarily a simple directional controller. The up and down inputs of the directional controller control navigation between levels of the interface such as search, playback control, full screen playback, video browsing and channel browsing. The left and right inputs of the directional controller control various options at the active level of the user interface and the select input allows the user to select an option. The user can browse various channels and videos within a channel to select media for playback. Videos in a channel play continuously to minimize input from the directional controller.

20 Claims, 11 Drawing Sheets

INTERFACE FOR WATCHING A STREAM OF VIDEOS

RELATED APPLICATIONS

This application claims priority to U.S. Provisional Patent Application No. 61/488,682, entitled INTERFACE FOR WATCHING A STREAM OF VIDEOS, filed on May 20, 2011.

TECHNICAL FIELD

The present disclosure generally relates to video browsing, and specifically to browsing sets of videos and continuously playing a set of videos.

BACKGROUND

For current video hosting websites, such as YOUTUBE, the user interface includes a video display window where a currently selected video is presented, along with various means by which one or more other videos may be selected for viewing. In interfaces that are designed for display on a computer screen, the user can select another video by selecting a hyperlink or a thumbnail image that is displayed in a sidebar or by entering a keyword search for a new video.

However, the arrangement, appearance, and behavior of these user interfaces are designed to be used by a user of a conventional computer having input devices such as a mouse, which allows the user to easily move a cursor to any point on the display device, and keyboard, which allows for direct alphanumeric input. As such, these user interfaces become difficult to navigate when applied to televisions or other devices where the user input device provide very limited input controls. For instance, many televisions are controlled with a simple directional input device that has only up, down, left, and right buttons or keys, such as a directional pad ("D-pad") or the "arrow keys" on a keyboard Such devices do not provide for full, arbitrary placement control over a cursor, but instead only allow for limited vertical and horizontal movements.

The problem is compounded as the number of available videos increases. Many video hosting websites host millions of videos, thereby making it all the more important to provide a user interface by which the user can easily browse and search for content of interest. Additionally, many users can now very easily view video content from video hosting sites on televisions and other display systems operated by D-pad type controllers, rather than with a computer mouse and keyboard. Users continue to expect to have the ease of use they are familiar with from their computer experiences in the different system environment of a television or similar display device.

SUMMARY

The present disclosure relates to computer-implemented methods, systems and computer program products for browsing of videos from a video hosting server using a directional control input device, such as a D-pad or the arrows keys on a keyboard, and selecting a video for playback. In one embodiment, a video is displayed to a user in a user interface of a client video player ("the current video"). In response to a user selection of an input control on the input device, a set of navigation controls are displayed overlaid on the current video, which is displayed full screen in the background behind the overlaid navigation controls. The navigation controls are designed for compatibility with the directional control input device.

The client player enables the user to navigate through multiple levels of controls, using the up and down inputs of the direction control input device, where each level of control provides a specific type of access functionality of accessing videos and controlling playback. For example, the levels may include a search level, a playback control level, a playback level, a video level and a channel level. The channel level displays a plurality of different channels (equivalently categories) of video content. The video level displays a plurality of videos available within a given channel. The playback level displays the current full screen video without overlaid controls. The playback control level displays a set of controls for controlling the playback of the current video. The search level provides an interface by which the user input a search query for searching for videos. The levels are linearly arranged so that the user intuitively knows the order of the levels and how to navigate between them using just the directional controls of the input device.

Within each level there are a number of options for viewing and controlling videos. The left and right directional controls allow the user to navigate the options at each of the various user interface levels. For example, at the video level, the horizontal navigation controls are effective to focus one of a plurality of video previews that is displayed. Focusing on a video preview causes the display of accompanying metadata providing additional information to the user. The user can then choose to play a focused video with a select input. The user can similarly browse through other options such as previews of channels, playback controls, or text entered in a search box.

The features and advantages described in this summary and the following detailed description are not all inclusive. Many additional features and advantages will be apparent to one of ordinary skill in the art in view of the drawings, specification and claims hereof.

The figures depict a preferred embodiment of the present disclosure for purposes of illustration only. One skilled in the art will readily recognize from the following discussion that alternative embodiments of the structures and methods illustrated herein may be employed without departing from the principles described herein.

DETAILED DESCRIPTION

Figure 1:
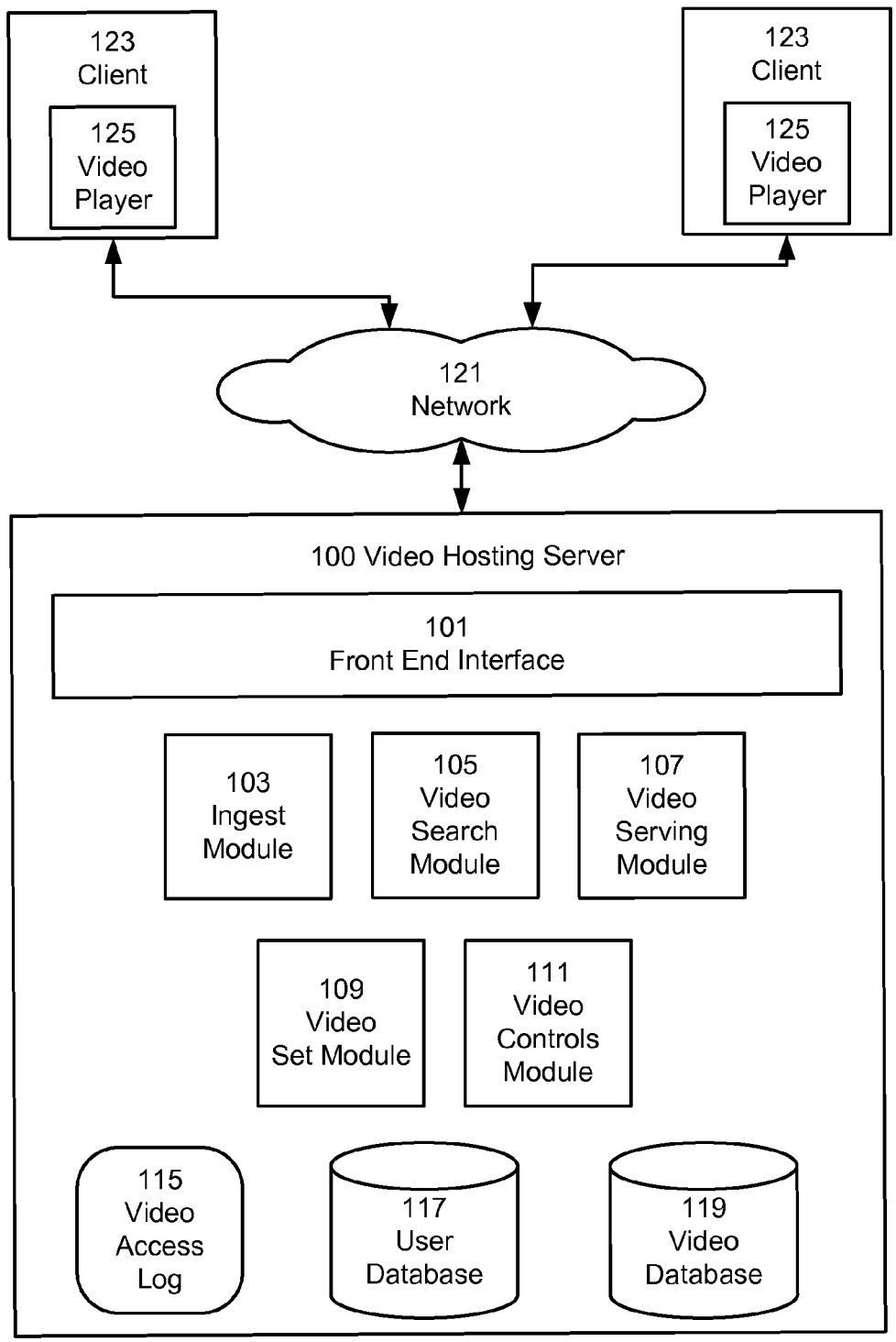
FIG. 1 is a block diagram of the system architecture in accordance with one embodiment.

FIG. 1 illustrates an exemplary system architecture of a video hosting system in accordance with one embodiment. The system includes clients 123 that communicate with a video hosting server 100 via a network 121. Generally, the video hosting server 100 is responsible for hosting uploaded media items for display to users of the clients 123. In the context of the system, the video hosting server 100 is specifically responsible for generating and providing to a video player in a client device instructions and data from which the video player can display a user interface as described herein. Alternatively, in other embodiments, the video player in the client can be responsible for generating the user interface. It should be noted that videos are just one example of media items, and in other embodiments, the principles described herein are applicable to any type of media items (e.g., pictures, music, etc).

As shown in FIG. 1, the video hosting server 100 comprises a front end interface 101, an ingest module 103, a video search module 105, a video serving module 107, a video set module 109, a video controls module 111, a video access log 115, a user database 117, and a video database 119. Many conventional features, such as firewalls, load balancers, application servers, failover servers, site management tools and so forth are not shown so as not to obscure the features of the system.

The video hosting server 100 can be accessed through various means. A suitable website for implementation of the video hosting server 100 is the YOUTUBE™ website, found at www.youtube.com; other video hosting sites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server 100 side can also be performed on the client 123 side in other embodiments if appropriate. In addition, the functionality attributed to a particular component can be performed by different or multiple components operating together. The server 100 can also be accessed as a service provided to other systems or devices through appropriate application programming interfaces, and thus is not limited to use in websites only.

The video hosting server 100 is implemented as server program executing on server-class computer comprising a CPU, memory, network interface, peripheral interfaces, and other well known components. The computers themselves run an operating system such as LINUX, Microsoft Windows, or Mac OS, have generally high performance CPUs, 2 G or more of memory, and 1 TB or more of disk storage. Of course, other types of computers can be used, and it is expected that as more powerful computers are developed in the future, they can be configured in accordance with the teachings here. The functionality implemented by any of the elements can be provided from computer program products (e.g., as computer executable instructions) that are stored in tangible computer-readable storage mediums (e.g., RAM, hard disk, or optical/magnetic media).

In one embodiment a client 123 executes a video player 125 and can connect to the video hosting server 100 to view media content, herein referred to as a "video," "video content" or "video items" via a network 121. Network 121 is typically the internet, but can also be any network, including but not limited to any combination of a LAN, a MAN, a WAN, a mobile, wired or wireless network, a private network, or a virtual private network. While only a two clients 123 and video players 125 are shown, it is understood that very large numbers (e.g., millions) of clients are supported and can be in communication with the video hosting server 100 at any time.

In one embodiment, the client 123 may include a variety of different computing devices, some examples of which are televisions, set top boxes, video game consoles, personal computers, digital assistants, personal digital assistants, cellular phones, mobile phones, smart phones, tablet computers and laptop computers. The client 123 may be adapted to work with various input devices, such examples of which are a mouse, keyboard, touch-screen, or remote control. In the various embodiments discussed here, the client 123 has a directional control type input device that is generally limited, in regards to controlling cursor (or "focus") movement, to directional inputs (e.g., up, down, left, right) and selection inputs (select or enter). Of course, other types of non-cursor inputs may be available on such a device (e.g., menu, context, programming, etc.).

The video player 125 includes any application that is adapted for playing and browsing videos stored on the video hosting server 100. The player can be adapted to play videos in various formats, such as Adobe Flash™, WebM, H.264, DivX, FFMPEG, and the like. In one embodiment, the video player 125 may be a standalone program that is specifically dedicated for video playback (e.g., a dedicated program in a set top box). In other embodiments, the video player 125 is a plug-in or add on to a web browser that allows users of client 123 to access web pages on the World Wide Web. Suitable applications are Microsoft Internet Explorer, Netscape Navigator, Mozilla Firefox, Apple Safari or any application adapted to allow access to web pages on the World Wide Web.

The video player 125 allows the user of client 123 to search for and browse through videos hosted by the video hosting server 100 via a user interface provided by the front end interface 101, and loaded into the video player 125. By loading the user interface in the video player 125, a user can find and play a video. The user can select other videos for playback by browsing through different sets of videos that are related to the current video. Alternatively, the user interface can be native to the video player 125, and then populated with its content in the manner as described below.

Users of the client devices 123 can also search for videos on the user interface based on keywords, tags or other metadata. In one embodiment, these requests are received as queries in the user interface provided by the front end interface 101 and are provided to the video search module 105, which searches the video database 119 for videos that satisfy the queries. The video search module 105 supports searching on any fielded data for video content, including its title, description, tags, author, category, comment, and so forth. The video serving module 107 retrieves videos selected by the video search module 105 from the video database 119, which is formatted into a file and transmitted to the client 123 for playback in the user interface.

In some embodiments, the video player 125 also allows users to upload videos to the video hosting server 100 via the user interface provided by the front end interface 101. In one embodiment, the uploaded videos provided by users are processed by an ingest module 103 at the video hosting server 100. The ingest module 103 processes the video for storage in the video database 119. The processing can include appropriate transformations for the video content. For example, video processing can include format conversion (transcoding), compression, metadata tagging, and other data processing. The uploaded videos can include, for example, video, audio or a combination of video and audio. The ingest module 103 processes the videos in order to standardize content for playback to users of client 123. Once uploaded videos have been formatted, the ingest module 109 stores the video into the database 119. An uploaded video is associated with the content publisher (i.e., the user that uploaded the video) and the content publisher's account record is updated in the user database 117 as needed.

The video database 119 is used to store videos. The video database 119 stores videos and associated metadata provided by their respective content owner who provided the videos. Each stored video is assigned a video identifier (ID) when it is processed by the ingest module 109. The videos have metadata associated with each video such as a video ID, artist, video title, label, genre, time length, and optionally georestrictions that can be used for data collection or content blocking on a geographic basis.

The user database 117 stores a record of all users viewing videos provided by the video hosting server 100. In one embodiment, the user database 117 stores a record of all users who have registered an account with the video hosting server 100. Each registered account includes at least a user name and e-mail address associated with the account. A registered account may also include information about the user associated with the account such as their name, hobbies, uploaded videos, favorite videos, and/or playlists of videos created by the users.

For each user, the video access log 115 tracks the user's interactions with videos, from which relationships between videos can be determined. Each entry in the video access log 160 identifies a video being accessed, a time of access, a user ID if available, data identifying the type of interaction with the video. Interaction types can include any user interaction, such as playing, saving, rating, sharing, pausing, rewinding, and forwarding a video. The video access log may also maintain information on videos users choose to watch as measured by click thru rates between videos and/or percentage of a video watched. For example, the click thru rate between a first and second video may be the rate at which users choose (e.g., via a user input selection, such as a click) to view the second video, when presented with the first video. For example, a click thru rate can be computed as the number of times users choose to view the second video divided by the number of times the users are presented with the option of playing the second video while the first video is being played. Alternatively, the click thru rate may be simply computed as the number of times a video is selected for display divided by the number of times the video is presented as available for displaying (e.g., a thumbnail or a link). This information as well as other types of information may be used to determine what videos are presented to a user.

The video set module 109 accesses the video access log 115, the user database 117 and/or video database 119 to identify sets of videos or channels that have related videos. A set of videos refers to any grouping of videos from the video database 119. For example, a set of videos may include:

(1) videos sharing common metadata (e.g., artist, genre, title, etc.);
(2) videos uploaded by the same user;
(3) videos in a user-created playlist;

The video controls module 111 manages the generation and display of contextual browsing controls for browsing of videos sets. The video controls module 111 receives from the client 123 user inputs with respect to the browsing controls, and updates the labels on the controls, and the video set that is presented in conjunction with the controls, and provides the updated information to front end interface 101 for presentation to the client 123.

In one embodiment, a hierarchy of control levels is used to allow a user to interact with the video server 100 and choose videos to play. For example, the levels may include a search level, a playback control level, a playback level, a video level, and a channel level displaying previews of videos within a channel. The search level provides an interface by which the user input a search query for searching for videos. The playback level displays the full screen video without overlaid controls. The playback control level displays a set of controls for controlling the playback of the current video. The video level displays a plurality of videos available within a given channel. The channel level displays a plurality of different channels (equivalently categories) of video content.

The browsing controls allow a user to move the cursor (or focus) between control levels, and to select items or controls within each level, such as sets of videos for playback from the channel level, or a specific video within a set of videos from the video level. Generally, the video controls module 111 receives user inputs from the client 123 via the front end interface 101 for switching between sets of videos, browsing within a set of videos, or selecting a video for playback. The user inputs are generally originated from a directional controller type of device, such as a D-pad controller, arrow keys on a keyboard, or the like, which have the semantics of "up," "down," "left", "right", and "select," though of course they can be transmitted as coded input signals.

In response, the video controls module 111 updates the user interface displayed and the video set that is presented in conjunction with the controls in accordance with the user input. In accordance with an embodiment, as the user changes control levels (e.g., by pressing "up" or "down" on the input device) the contextual controls displayed on the screen change. That is, for example, if a user is navigating the video control level, the contextual menu for the video control level is displayed. In response to receiving an "down" input, the contextual menu of the video control level is removed from the display (e.g., disappears) and is replaced by the contextual control menu of the channel control level.

In some embodiments, the functionality of the video controls module 111 may be implemented in the client 123 instead of the server 100. In one embodiment, a full screen video is constantly played on the client 123. Visual controls, e.g., playback controls, that are in use by the user can be displayed on top of the full screen video (i.e., as a screen overlay). The controls can be displayed semi-transparently or opaquely on top of the full screen video.

The contextual controls allow for a simple and intuitive method of selecting an additional video to watch. Also, because a user can interact with the controls with a simple set of inputs (e.g., up, down, left, right, select), the interface is particularly beneficial when used in conjunction with devices that have constrained inputs.

Figure 2:
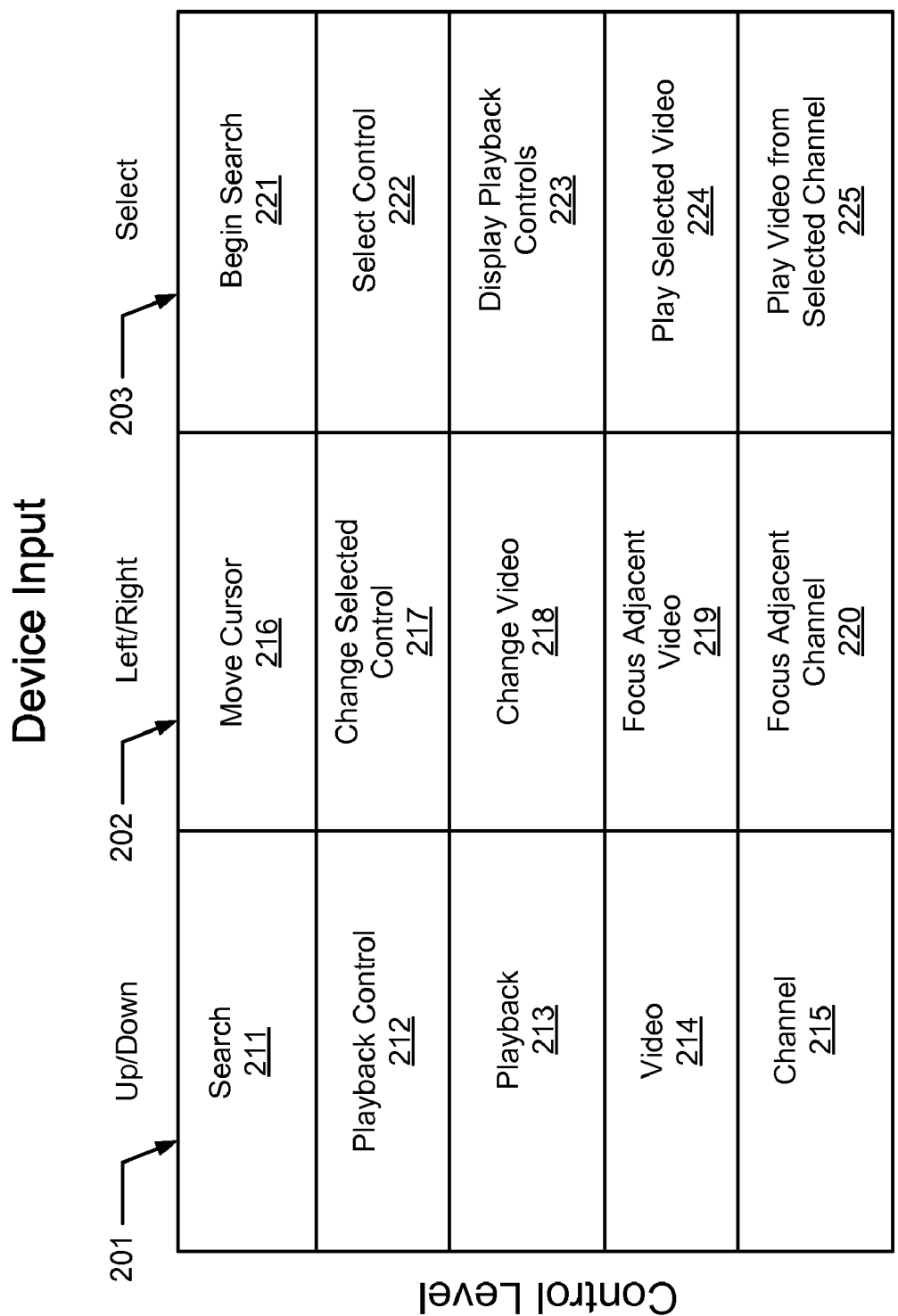
FIG. 2 illustrates a chart of the levels of control and the response to user input for each level in accordance with one embodiment.

FIG. 2 illustrates a chart of the levels of control and the response to device input for each level in accordance with one embodiment. Column 201 of the chart lists the levels of control available to a user of client 123. In one embodiment, the levels of control include search, playback control, playback, videos and channels. The levels of control listed are merely exemplary and different or additional levels may be used in their place. The search level 211 provides search functionality by which the user can enter a search query in order to select a certain channel or video. The playback control level 212 provides playback controls for controlling the currently display video, which may include play, pause, fast forward and various other controls. The playback level 213 plays the current video in full screen without any overlaid controls. The video level 214 provides access to a plurality of videos that are a part of the channel (or set) associated with the current video. The channel level 215 provides access to a plurality of channels for the user to choose from. Activation of each level via an input control results in the display of specific control features associated with the activated level, while the control features from the previous level may be removed, or displayed in a subdued format, to provide context for the currently active level.

The user switches (equivalently, moves the focus) between the various levels by utilizing the up and down inputs (generally, vertical inputs) of a directional input device. For example, if currently at the playback level 212, an up input would result in switching to the search level 211, while a down input would result in switching to the playback level 213. In a similar manner, a user can switch between all of the levels listed in column 1 201 through use of up and down inputs.

Column 202 lists the actions that occur at a given control level when a left or right input (generally, horizontal input) is received from the directional input device. Similarly, column 203 lists the actions that occur at a given level when a select input is received from the directional input device. For example, while at search level 211, a user can input a string into an input field for a search query. At this level, the left and right inputs of the input device result in a cursor moving 216 left or right in the input field, such that the user can edit the input. Additionally, a select input begins 221 the search query and requests search results from the server 100 to display to the user. While in the playback control level 212, a horizontal input alters 217 the control that is currently selected by the user. A select input executes 222 the currently selected control.

At the playback level 213, a left input causes to the video player to immediately play the previous video in the current channel, while a right input causes the video player 125 to immediately play the next video that is scheduled to play in the current channel. In one embodiment, reception of a select input while at the playback level 213 causes the client 125 to display playback controls as if an up input was received to switch to playback control level 212.

Entering the video level 214 displays a plurality of videos that are a part of the current channel from which the currently playing video originated. A left or right input changes which of the plurality of videos has the focus, respectively the previous or next video. In one embodiment, providing the focus to a video causes the player to display metadata for the video, including author, date of submission and title. In addition, a select input causes the video player 125 to play 224 the focused video. When the video level 214 is entered, the channel level 215 may also be displayed concurrently therewith, with the current channel being graphically indicated.

Entering channel level 215 causes a plurality of channels to be displayed. Left and right inputs allow the user to focus 220 a channel, respectively the previous or next channel. As the user moves the focus from one channel to the next, the video player 125 displays in the video level 214 previews or thumbnails of videos that are a part of the currently focused channel. A select input from the directional controller selects 225 the focused channel and begins playback of a first video from the channel. In one embodiment, at the conclusion of the first video, additional videos from the selected channel will play continuously.

Figure 2A:
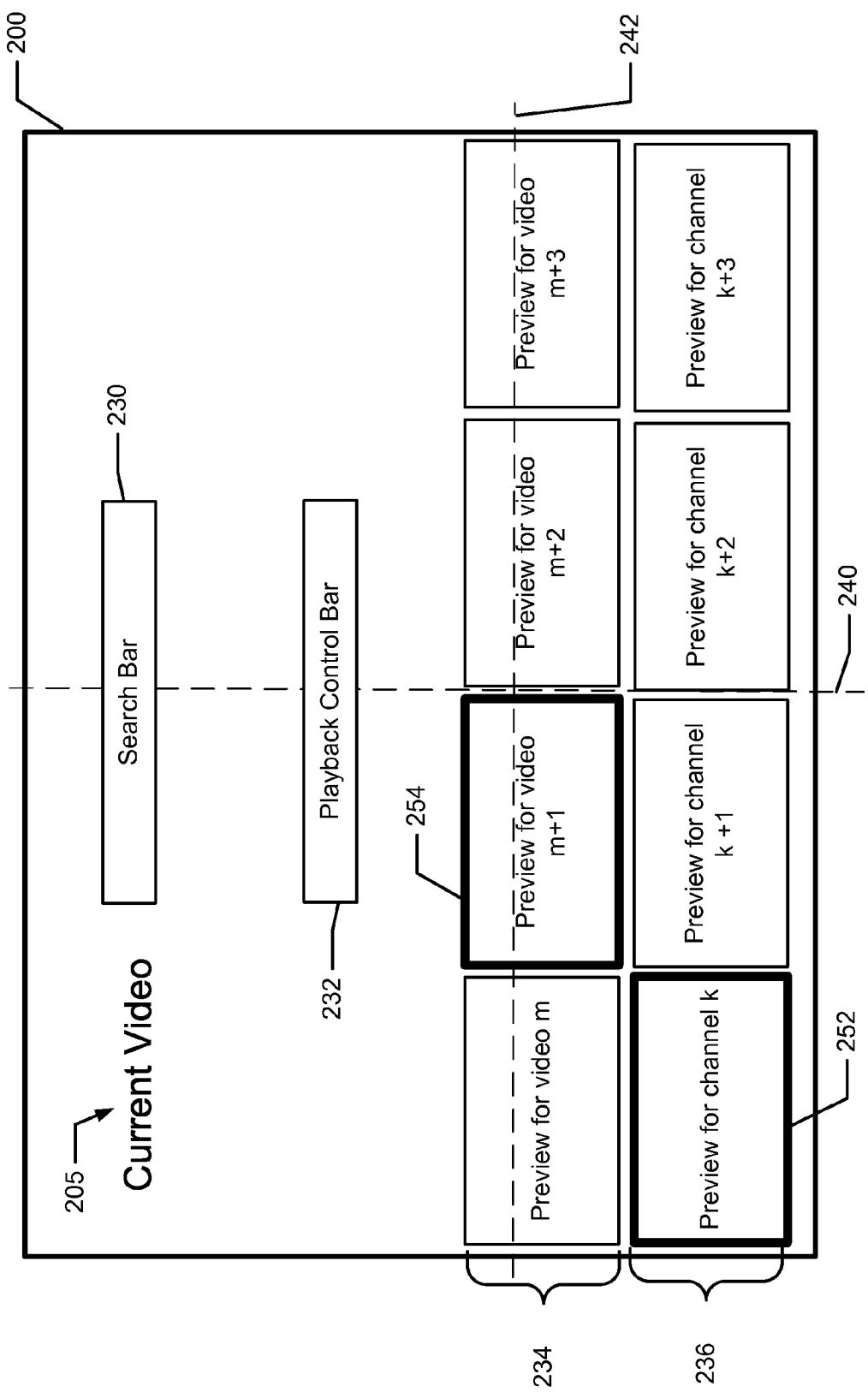
FIG. 2A illustrates a schematic view of a video browsing interface in accordance with one embodiment.

FIG. 2A illustrates a schematic view of a video browsing interface in accordance with one embodiment. As shown, a current video 205 would play in the background of the user interface 200. While five levels of the user interface are shown in the schematic, a subset of the levels may be shown to the user at any given time. Generally, the levels are organized along the vertical axis 240 for ease of navigation and options within each of the levels are organized along the horizontal axis 242. A search bar 230 allows entry of a search query at the search level 211. A playback control bar 232 allows control of the current video 205 while at the playback control level 212. At the playback level, the current video 205 is displayed with all or most user interface controls hidden. A row of video previews 234 is displayed along the bottom portion of the screen at the video level 214 and the channel level 215. Similarly, a row of channel previews 236 is displayed along the bottom portion of the screen at the video level 214 and the channel level 215. Focus on a channel preview and/or video preview may be indicated by the user interface, e.g., by highlighting, change of color, luminance, shape etc. As illustrated, at the video level, a preview for channel k 252 may be focused to indicate which channel the videos in the row of video previews 234 belong to. Additionally, a preview for video m+1 254 may be focused to indicate a focused video during browsing. An indication of focus can designate which video will play when a select input is received at the video level 214.

Figure 3:
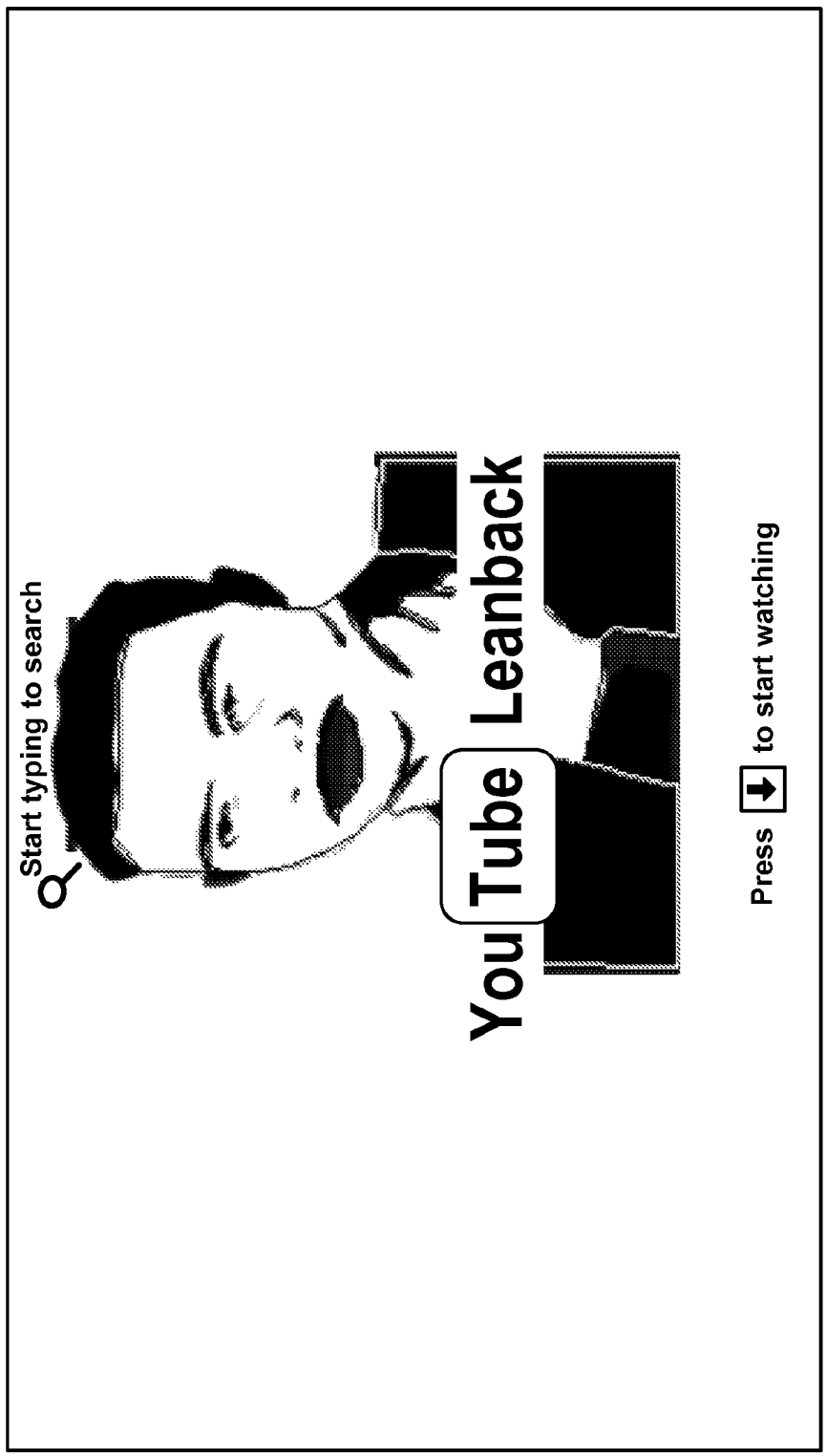
FIG. 3 illustrates a welcome screen that is displayed on startup in accordance with one embodiment.

FIG. 3 illustrates a welcome screen that is displayed on startup by the video player in accordance with one embodiment. The welcome screen is displayed to help familiarize the user with the user interface. Alternatively, on startup the system could begin displaying full screen video without any welcome screen or other overlay. As illustrated, the user is prompted to begin typing to enter a search query or press down to begin watching full screen video.

Figure 4:
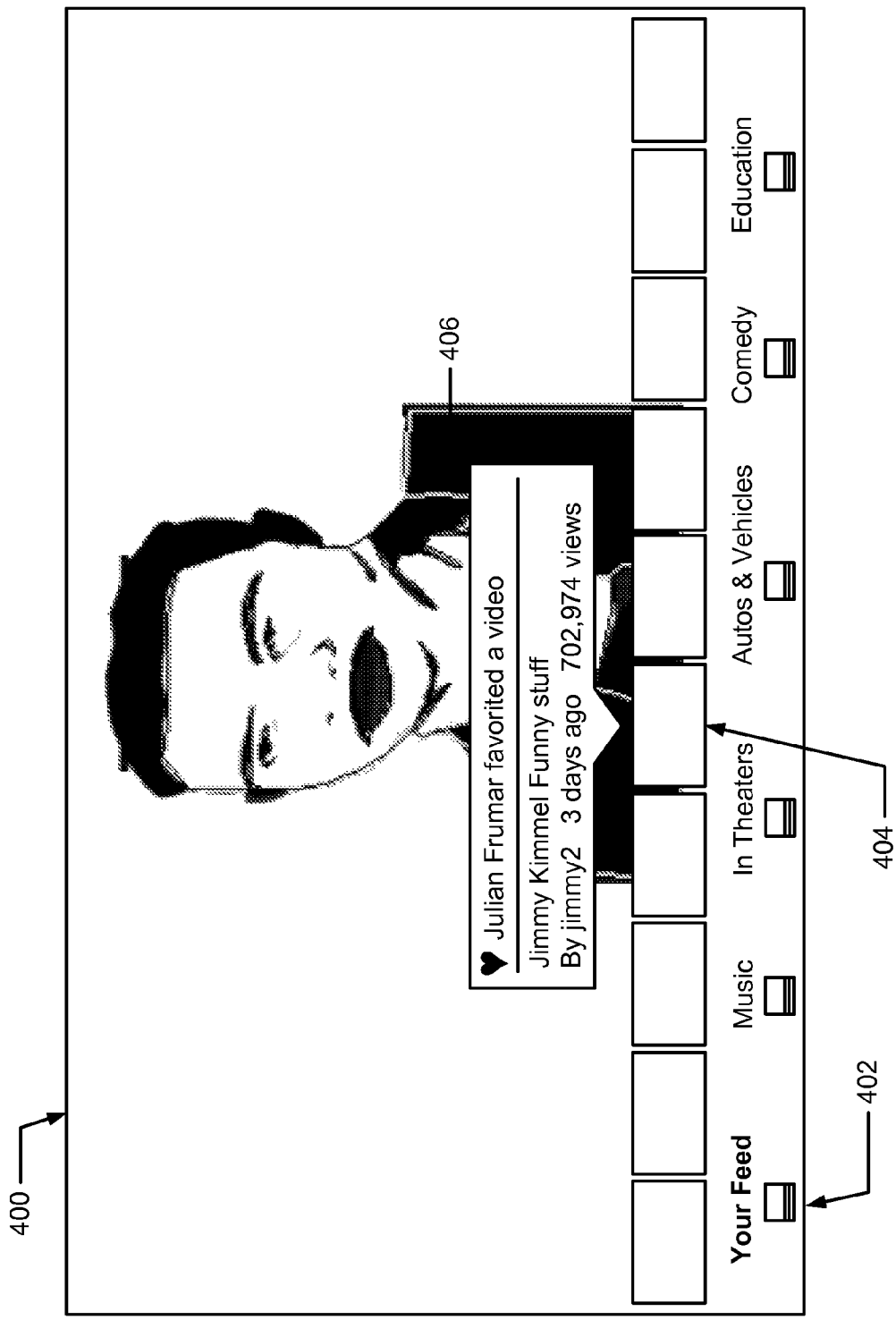
FIG. 4 illustrates the video level of the user interface in accordance with one embodiment.

FIG. 4 illustrates the video level 214 in accordance with one embodiment. Full screen video 400 is displayed in a significant portion of the screen. Hence, the user can navigate the video level while still being able to view the video that is currently playing. The current video set or channel 402 is displayed near the bottom of the screen in a row of channels (here, "Your Feed," "Music," "In Theaters," "Autos & Vehicles," "Comedy," and "Education"). These channels are shown in a subdued format, here both grayed out, and small icons. The display of the additional channels in conjunction with the video channel provides the user with a general context of the available content at two different levels simultaneously. The additional channels displayed along the bottom of the screen can be accessed by entering the channel level in response to a down input from the direction controller. Above the row of channels, the videos that are in the current channel are displayed across the screen.

In the video level, the user navigates the videos and focuses on individual videos with the left and right controls of the directional controller. The user is not limited to the videos that are initially displayed. Navigating in one direction to the edge of the window causes the row of videos to scroll in the opposite direction, and new videos to move into the viewable area. One focused video 404 is selected in the row of videos and can be chosen for playback by a selection input from the directional controller. Metadata is displayed in an information box 406 associated with the focused video 404. The metadata may include title, author, submission date, video length, and number of views. As previously mentioned, at the conclusion of a current video, an additional video from the same channel as the current video may begin to play automatically in order to provide continuous playback to the user. In one embodiment, the row of videos is displayed when the additional video begins and the information box 406 is displayed containing metadata for the additional video to provide additional context to the user. In another embodiment, only information box 406 is displayed when the additional video begins to provide metadata related to the additional video to the user.

Figure 5:
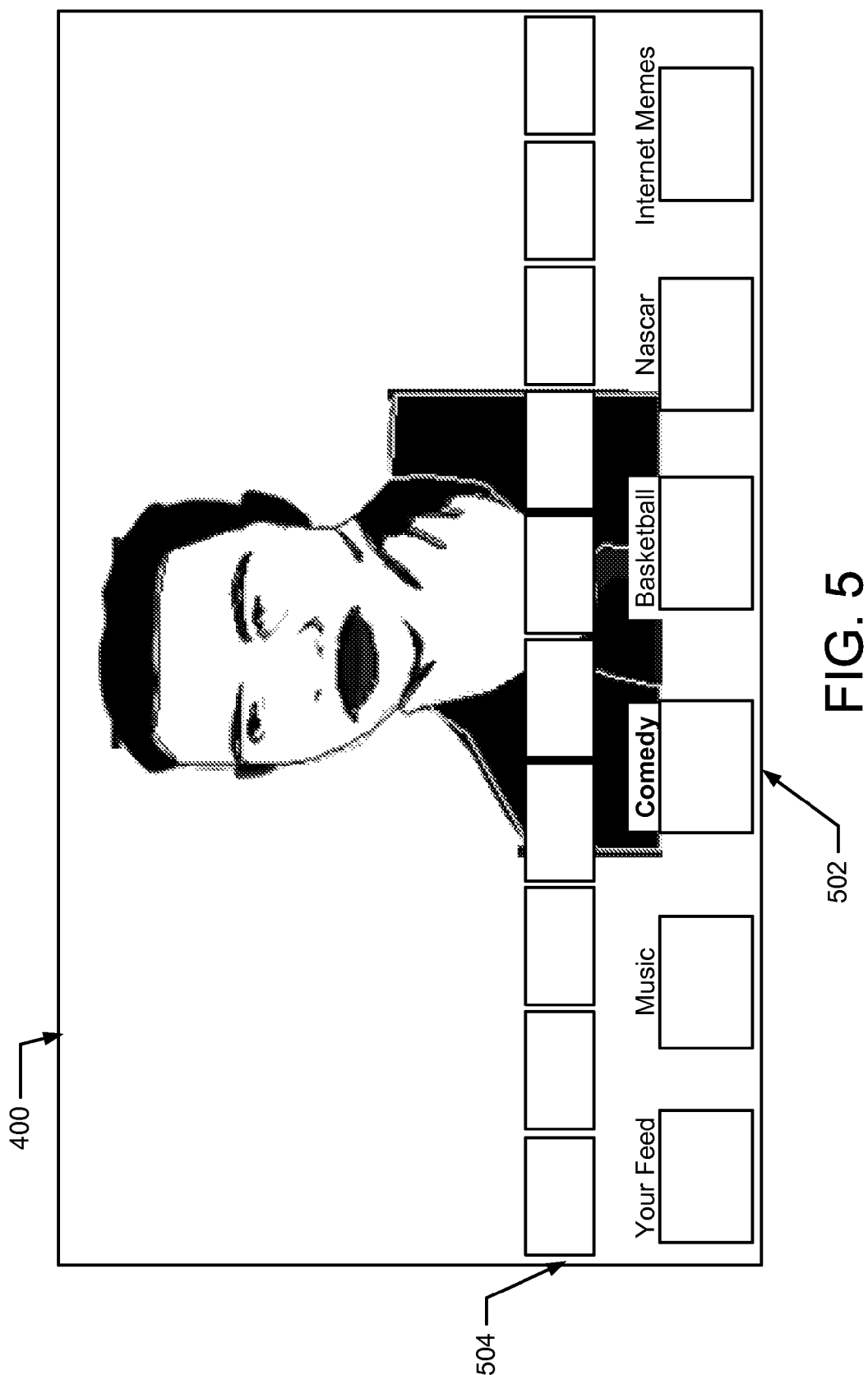
FIG. 5 illustrates the channel level of the user interface in accordance with one embodiment.

FIG. 5 illustrates the channel level in accordance with one embodiment. The channel level can be accessed in response to a down input from the directional controller while at the video level. Full screen video 400 is again displayed in a significant portion of the screen. Initially, the current channel is the focused channel 502 in the row of channels near the bottom of the screen. In response to left and right inputs from the directional controller, the video player navigates through a plurality of channels, moving the focus between channels. A preview row of videos 504 associated with the focused channel is displayed above the focused channel 502, again providing two level of context simultaneously. If a select input is received from the directional controller, a video from the focused channel 502 begins to play and additional videos from the focused channel are queued for playback. In one embodiment, an up input from the directional controller enters video level 214 of the currently focused channel. Alternatively, an up input from the directional controller enters video level 214 of the channel from which the full screen video 400 originated regardless of the currently focused video 502.

Figure 6:
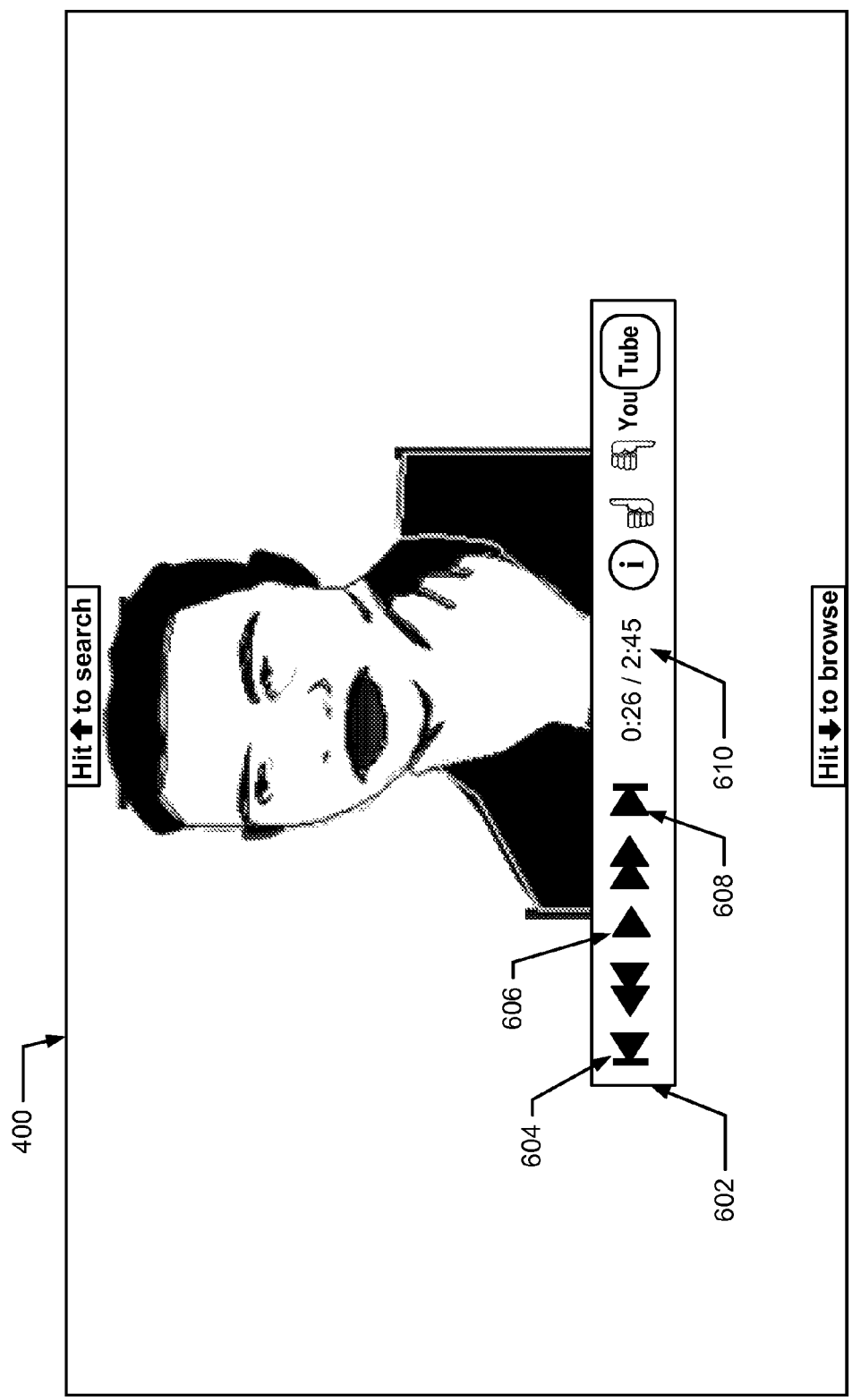
FIG. 6 illustrates the playback control level of the user interface in accordance with one embodiment.

FIG. 6 illustrates the playback control level in accordance with one embodiment. The playback control level is accessed through an up input from the directional controller while at the playback level, or by a down input from the directional controller while at the search level. Full screen video 440 is displayed in a significant portion of the screen. A control bar 602 is overlaid on the full screen video 400. The control bar 602 contains icons allowing the user to control playback of the video including a previous video button 604, a play/pause button 606, and a next video button 608. As illustrated, the control bar 602 also includes a time icon 610 indicating the current position in and the total length of the current video.

Figure 7:
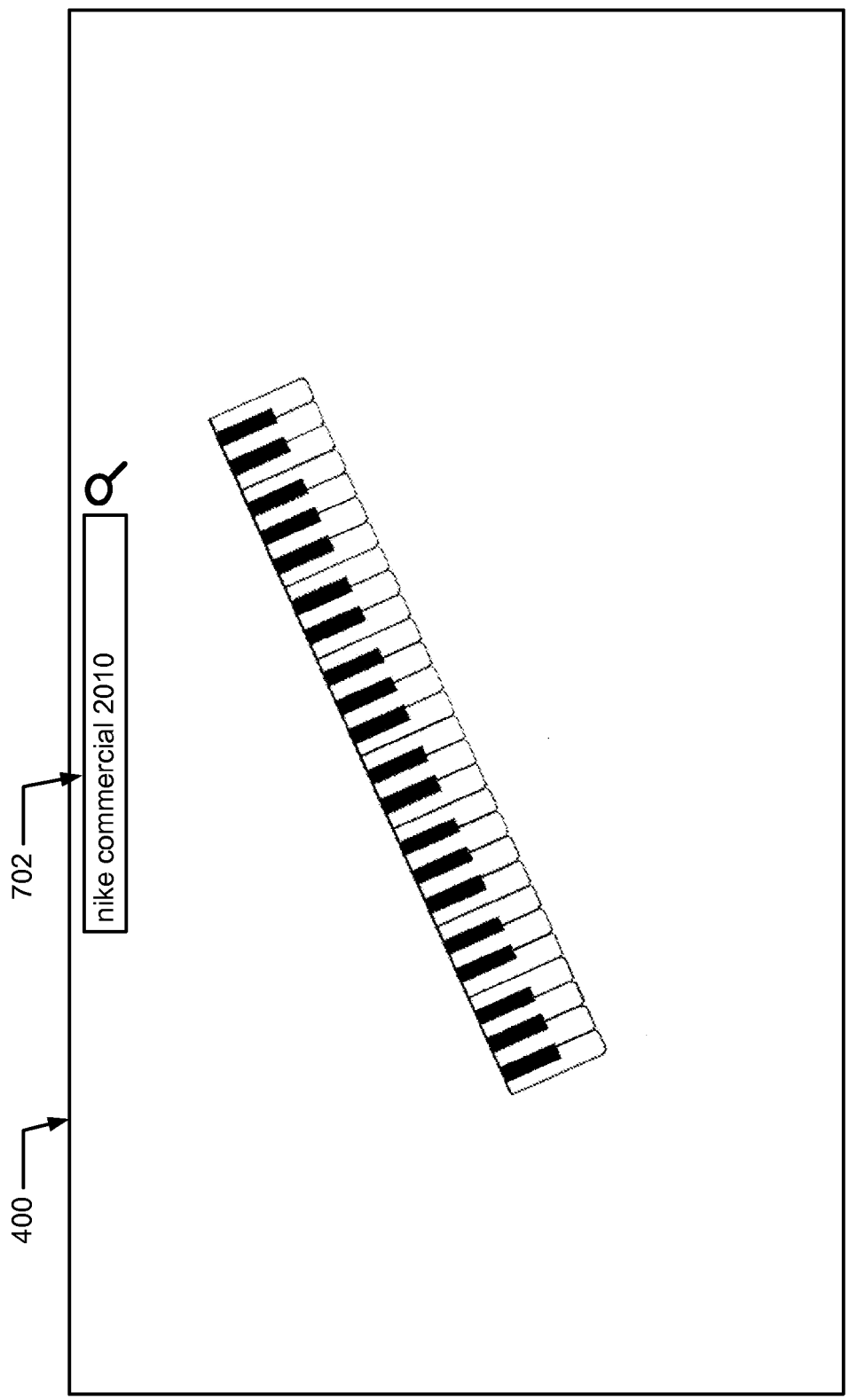
FIG. 7 illustrates the search level of the user interface in accordance with one embodiment.

FIG. 7 illustrates the search level in accordance with one embodiment. The search level is generally accessed by an up input from the directional controller while at the playback control level. In one embodiment, the search level is accessed in response to user search input (e.g., text inputs) at any other level. The video player displays a search bar 702 overlaid on full screen video 400. The user can enter a search query into the search bar 702. In response to the query, the player 125 transmits the query to the video hosting system 100, which executes a search for relevant videos or channels. Text input can be accomplished through well known methods including a traditional keyboard, a virtual keyboard, or on screen character selection with a directional controller.

Figure 8:
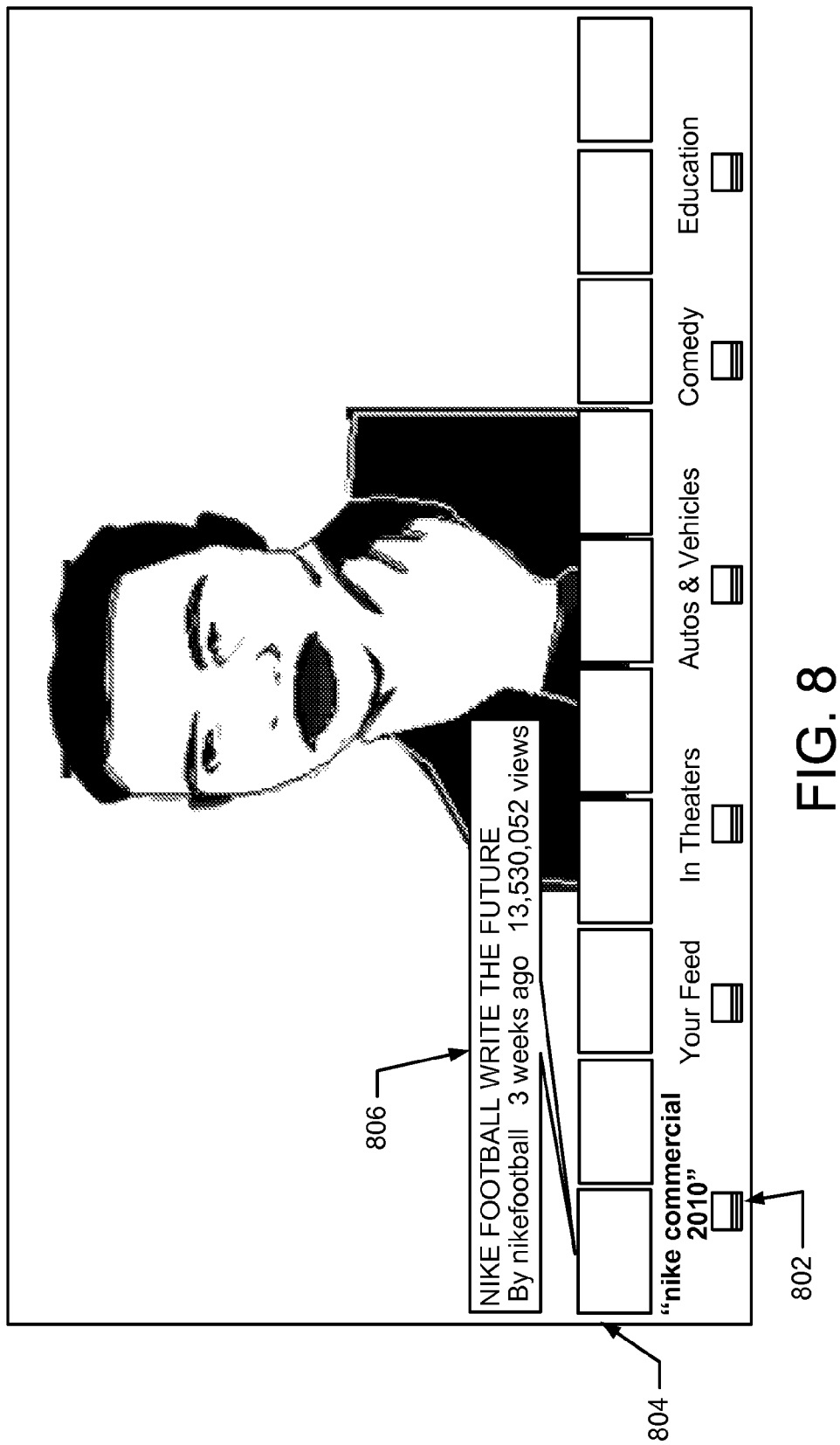
FIG. 8 illustrates search results displayed as a channel in accordance with one embodiment.

FIG. 8 illustrates how the video player displays search results as a channel in accordance with one embodiment. Here, the search results are displayed as the videos contained in a channel. A search channel 802 is generated containing the video search results of the search query entered by the user. After entering the search query, the system enters the video level allowing the user to browse videos in the row of video previews 804. Metadata displayed in information box 806 aids the user in selecting a video.

Figure 9:
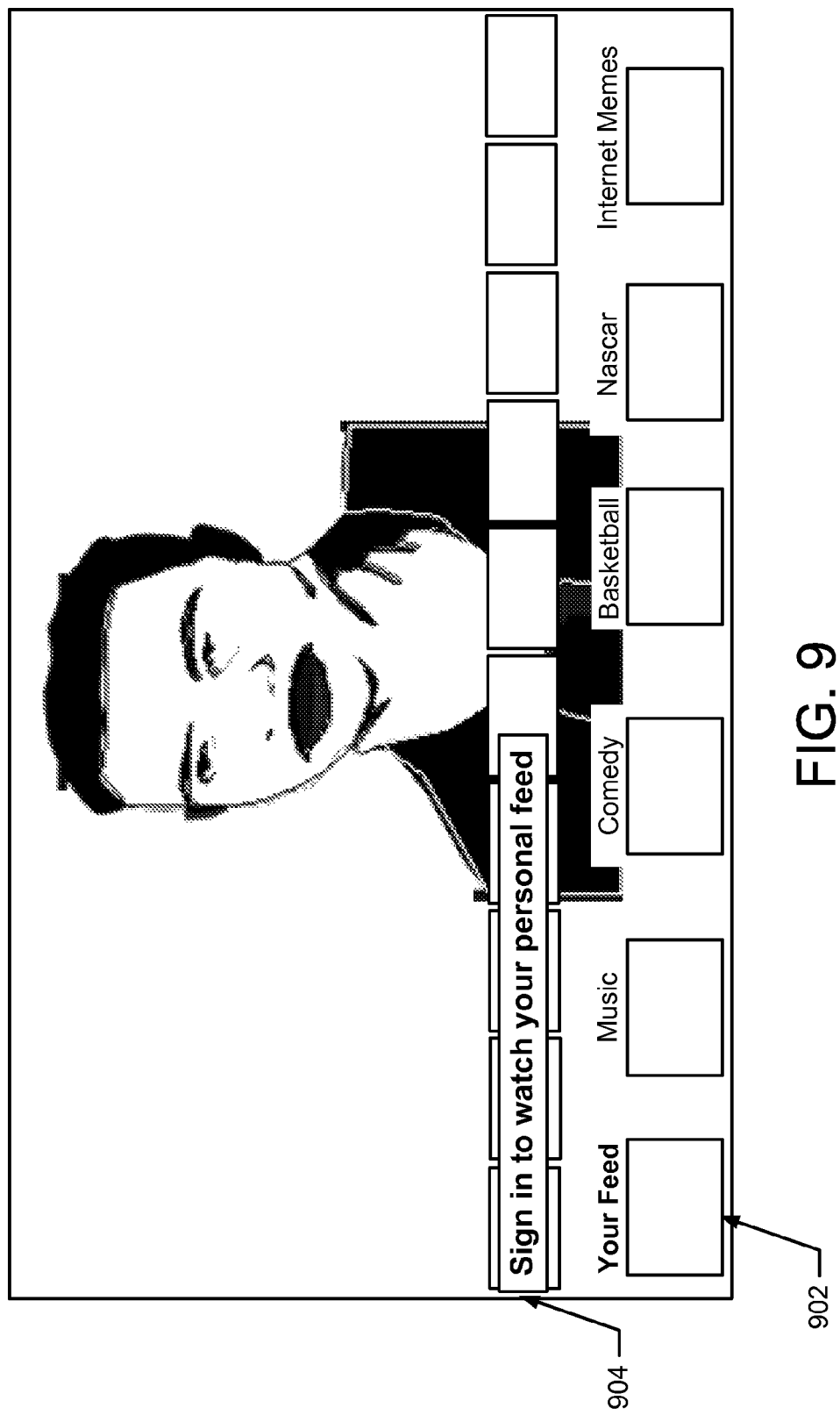
FIG. 9 illustrates a user sign in prompt displayed as a channel in accordance with one embodiment.

FIG. 9 illustrates a user sign in prompt displayed by the video player as a channel in accordance with one embodiment. In one embodiment, a user sign in prompt 902 is displayed as a channel while at the channel level and/or the video level. In response to receiving the focus on this prompt and then receiving a selection from the directional controller, the video player displays sign in window into which the user can input their logon credentials (e.g., user name and password) to sign in to their account. After signing in, the user interface can be customized for the user. For example, the videos displayed in the row of video previews 904 are those associated with the user's account.

In one embodiment, after signing in, a feed channel is automatically displayed to the user in the row of channel previews, and includes videos that are determined to be relevant to the user, based on the user's interest (either express or derived from the user's historical viewing behavior), social network, and/or previous search queries by the user, or the like. For example, the feed channel may contain videos from channels that the user has subscribed to (an example of relevance based on an expressed interest), videos that have been shared or recommended by friends of the user (an example of relevance based on the user's social network), and/or videos related to other videos that the user has previously watched (an example of relevance based on historical viewing behavior). In one embodiment, if the user is already logged in, upon startup of the video player 125, the feed channel automatically begins playing as full screen video at the playback level 213. The customized nature of the feed increases the likelihood of interest from the user.

Figure 10:
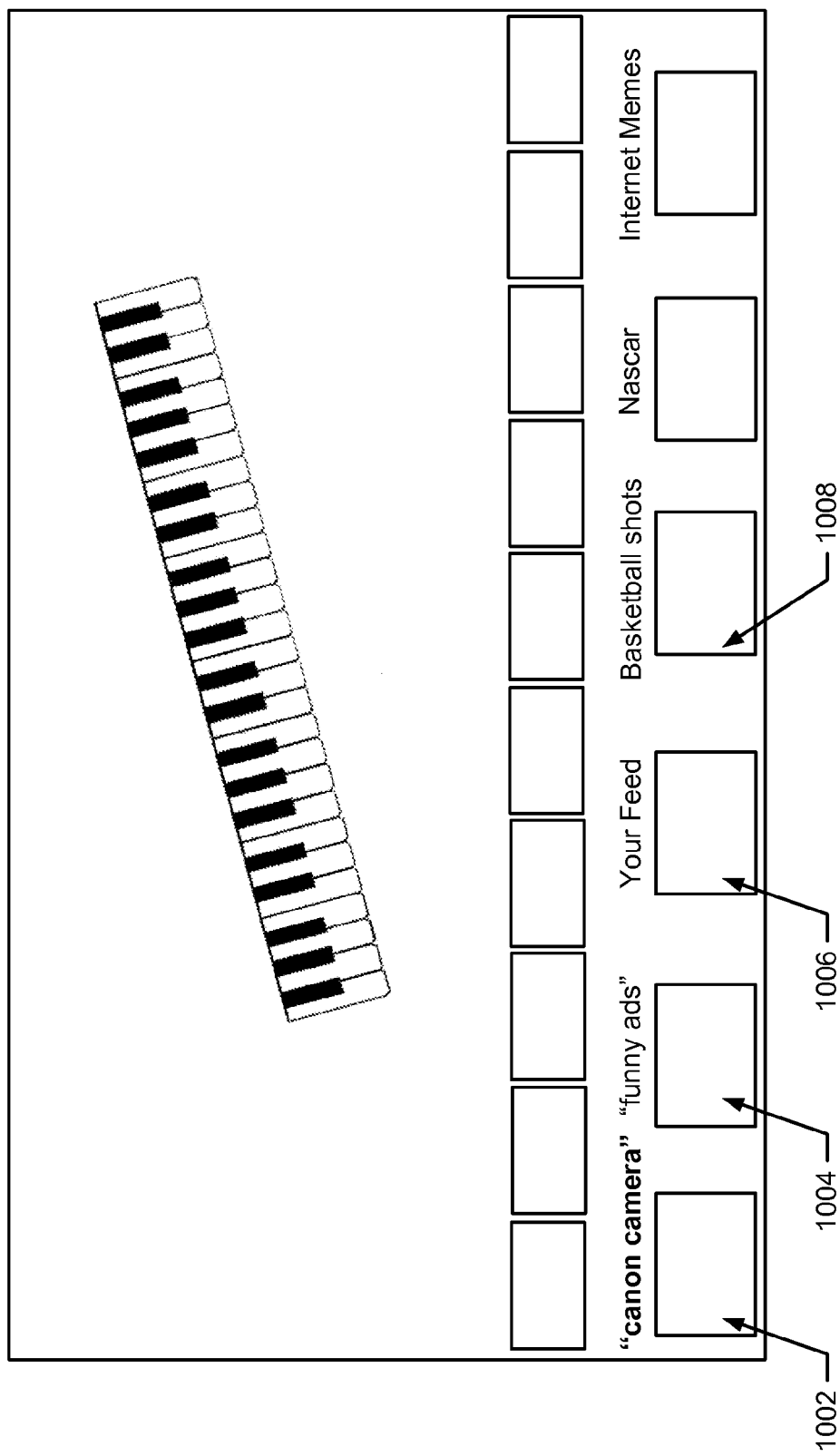
FIG. 10 illustrates channels with type indicators in accordance with one embodiment.

FIG. 10 illustrates channels with type indicators in accordance with one embodiment. In this embodiment, channel icons displayed along the bottom of the screen at the video level or channel level include type indicators. For example, search indicators 1002 and 1004 are displayed on channels that were generated due to a search query. A feed indicator 1006 indicates that a channel is a feed based on user preferences. Additionally, a playlist indicator 1008 identifies channels that are playlists created by a user of the video hosting server 100.

The above described user interfaces are generally displayed by the video player in response to commands and data provided by the video hosting service 100. The service 100 generally provides the underlying video content, metadata, labels, previews, and other dynamic elements. The player uses this data in conjunction with internal programming logic that implements the functional operations described above in response to the inputs received from the directional controller.

The apparatus described above for performing the described operations may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed embodiments. This description should be read to include one or at least one and the singular also includes the plural unless it is obvious that it is meant otherwise. Similarly, the terms "first" and "second" are generally used herein to allow clear referencing of different elements of a same class (e.g., a "first label" as simply distinguished from "a second label"), rather than designating an ordering, ranking, or placement of the first item relative to the second item.

Upon reading this disclosure, those of skill in the art will appreciate still additional alternative structural and functional designs for a system and a process for browsing video sets through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for controlling playback of videos, the method comprising:
providing a display of controls for a plurality of videos;
responsive to a first input from a directional controller along a first axis of the directional controller, providing a display of one or more levels of control for controlling video playback, wherein the levels of control include a channel level and a video level, the channel level including a plurality of channel previews for a plurality of channels, and the video level including a plurality of video previews for a plurality of videos;
setting a focus on a first channel preview of a first channel in the channel level of control;
responsive to the focus on the first channel preview, displaying in the video level a plurality of video previews for the first channel;
responsive to a second input from the directional controller along a second axis of the directional controller, moving the focus from the first channel preview to a second channel preview of a second channel in the channel level of control; and
responsive to the focus on the second channel preview, replacing the plurality of video previews in the video level with a second plurality of video previews for the second channel.

2. The method of claim 1, wherein the channel level includes a search result displayed as a search result channel, the search result channel associated with a plurality of search video previews.

3. The method of claim 1, wherein the plurality of videos is displayed sequentially without interaction from a user.

4. The method of claim 1, wherein the display of one or more levels of control is overlaid on one or more of the plurality of videos.

5. The method of claim 1, wherein the first axis of the directional controller is in a vertical direction and the second axis of the directional controller is in a horizontal direction.

6. The method of claim 1, wherein metadata associated with a first video preview of the second plurality of video previews is displayed responsive to the focus on the first video preview.

7. The method of claim 1, responsive to a selection of the focused second channel, playing a video associated with one of the second plurality of video previews.

8. An apparatus for controlling playback of videos, the apparatus comprising a non-transitory computer-readable medium encoding instructions thereon that, in response to execution by a computing device, cause the computing device to perform operations comprising:
providing a display of controls for a plurality of videos;
responsive to a first input from a directional controller along a first axis of the directional controller, providing a display of one or more levels of control for controlling video playback, wherein the levels of control include a channel level and a video level, the channel level including a plurality of channel previews for a plurality of channels, and the video level including a plurality of video previews for a plurality of videos;
setting a focus on a first channel preview of a first channel in the channel level of control;
responsive to the focus on the first channel preview, displaying in the video level a plurality of video previews for the first channel;
responsive to a second input from the directional controller along a second axis of the directional controller, moving the focus from the first channel preview to a second channel preview of a second channel in the channel level of control; and
responsive to the focus on the second channel preview, replacing the plurality of video previews in the video level with a second plurality of video previews for the second channel.

9. The apparatus of claim 8, wherein the channel level includes a search result displayed as a search result channel, the search result channel associated with a plurality of search video previews.

10. The apparatus of claim 8, wherein the plurality of videos is displayed sequentially without interaction from a user.

11. The apparatus of claim 8, wherein the display of one or more levels of control is overlaid on one or more of the plurality of videos.

12. The apparatus of claim 8, wherein the first axis of the directional controller is in a vertical direction and the second axis of the directional controller is in a horizontal direction.

13. The apparatus of claim 8, wherein metadata associated with a first video preview of the second plurality of video previews is displayed responsive to the focus on the first video preview.

14. The apparatus of claim 8, responsive to a selection of the focused second channel, playing a video associated with one of the second plurality of video previews.

15. A system for controlling playback of videos, the system comprising:
   a computer processor; and
   a computer-readable storage medium storing instructions for controlling the processor to perform a method comprising:
   providing a display of controls for a plurality of videos;
   responsive to a first input from a directional controller along a first axis of the directional controller, providing a display of one or more levels of control for controlling video playback, wherein the levels of control include a channel level and a video level, the channel level including a plurality of channel previews for a plurality of channels, and the video level including a plurality of video previews for a plurality of videos;
   setting a focus on a first channel preview of a first channel in the channel level of control;
   responsive to the focus on the first channel preview, displaying in the video level a plurality of video previews for the first channel;
   responsive to a second input from the directional controller along a second axis of the directional controller, moving the focus from the first channel preview to a second channel preview of a second channel in the channel level of control; and
   responsive to the focus on the second channel preview, replacing the plurality of video previews in the video level with a second plurality of video previews for the second channel.

16. The system of claim 15, wherein the channel level includes a search result displayed as a search result channel, the search result channel associated with a plurality of search video previews.

17. The system of claim 15, wherein the plurality of videos is displayed sequentially without interaction from a user.

18. The system of claim 15, wherein the first axis of the directional controller is in a vertical direction and the second axis of the directional controller is in a horizontal direction.

19. The system of claim 15, wherein metadata associated with a first video preview of the second plurality of video previews is displayed responsive to the focus on the first video preview.

20. The system of claim 15, responsive to a selection of the focused second channel, playing a video associated with one of the second plurality of video previews.

* * * * *